United States Patent
Jameson

(10) Patent No.: US 7,603,455 B2
(45) Date of Patent: Oct. 13, 2009

(54) MANAGING A USER NETWORK OF A PARTITIONED NETWORK

(75) Inventor: David D. Jameson, Rowlett, TX (US)

(73) Assignee: Fujitsu Limited, Kawasaki (JP)

( * ) Notice: Subject to any disclaimer, the term of this patent is extended or adjusted under 35 U.S.C. 154(b) by 507 days.

(21) Appl. No.: 11/535,682

(22) Filed: Sep. 27, 2006

(65) Prior Publication Data
US 2008/0077684 A1 Mar. 27, 2008

(51) Int. Cl.
G06F 15/16 (2006.01)
G06F 15/173 (2006.01)
(52) U.S. Cl. .................. 709/223; 709/249
(58) Field of Classification Search .......... 709/223, 709/249, 218; 370/352, 389
See application file for complete search history.

(56) References Cited

U.S. PATENT DOCUMENTS

| | | | | |
|---|---|---|---|---|
| 5,640,505 A | * | 6/1997 | Hearn et al. ............... | 714/4 |
| 6,205,563 B1 | * | 3/2001 | Lewis ......................... | 714/47 |
| 6,973,034 B1 | * | 12/2005 | Natarajan et al. ........... | 370/232 |
| 2006/0036719 A1 | * | 2/2006 | Bodin et al. ................ | 709/223 |
| 2006/0140190 A1 | * | 6/2006 | Lee ............................ | 370/395.3 |
| 2007/0206512 A1 | * | 9/2007 | Hinds et al. ................ | 370/254 |
| 2008/0025722 A1 | * | 1/2008 | Gerstel ....................... | 398/51 |

OTHER PUBLICATIONS

"Netsmart® 1500, Scalable Centralized Management Software", NETSMART1500/DS/8.0/11.04/CM, Copyright 2004 Fujitsu Network Communications, Inc., 2 pages.
"Netsmart® 1500, Operations and Maintenance", NETSMARTMAINT/DS/2.0/07.05/PDF, Copyright 2004 Fujitsu Network Communications, Inc., 2 pages.
"HP OpenView solution and product guide", www.hp.com/managementsoftware, © 2003-2006 Hewlett-Packard Development Company, L.P., 28 total pages, Spring 2006.

* cited by examiner

Primary Examiner—Krisna Lim
(74) Attorney, Agent, or Firm—Baker Botts L.L.P.

(57) ABSTRACT

Managing a partitioned network includes receiving a request to create a user network of a network. The network comprises domains, where a domain comprises one or more groups, and a group comprises one or more network elements. The user network is created. The user network comprises one or more user domains, where a user domain represents a domain to which a user has access.

14 Claims, 2 Drawing Sheets

MANAGING A USER NETWORK OF A PARTITIONED NETWORK

TECHNICAL FIELD

This invention relates generally to the field of network management and more specifically to managing a user network of a partitioned network.

BACKGROUND

A network may be partitioned in order to create logical subsections of the network. Users may be allowed access to specific subsections. Limiting the access of a user to specific subsections may improve the security of the network.

Known techniques for managing partitioned networks are not efficient in certain situations. For example, users operating in a partitioned network may have a difficult time adding network elements to or removing network elements from the subsections to which they have access. It is generally desirable to have efficient techniques for managing partitioned networks.

SUMMARY OF THE DISCLOSURE

In accordance with the present invention, disadvantages and problems associated with previous techniques for managing partitioned networks may be reduced or eliminated.

According to one embodiment of the present invention, managing a partitioned network includes receiving a request to create a user network of a network. The network comprises domains, where a domain comprises one or more groups, and a group comprises one or more network elements. The user network is created. The user network comprises one or more user domains, where a user domain represents a domain to which a user has access.

Certain embodiments of the invention may provide one or more technical advantages. A technical advantage of one embodiment may be that a network element added to a group may inherit the domain to which the group belongs. Accordingly, a user may add a network element to a group, without specifying the domain of the group.

Another technical advantage of one embodiment may be that a user network view may be provided. The user network view may show the network elements to which a user has access, but not network elements to which the user does not have access. Accordingly, the user may view the network elements to which the user has access while being prevented from viewing network elements to which the user does not have access.

Certain embodiments of the invention may include none, some, or all of the above technical advantages. One or more other technical advantages may be readily apparent to one skilled in the art from the figures, descriptions, and claims included herein.

BRIEF DESCRIPTION OF THE DRAWINGS

For a more complete understanding of the present invention and its features and advantages, reference is now made to the following description, taken in conjunction with the accompanying drawings, in which.

DETAILED DESCRIPTION OF THE DRAWINGS

Figure 1:
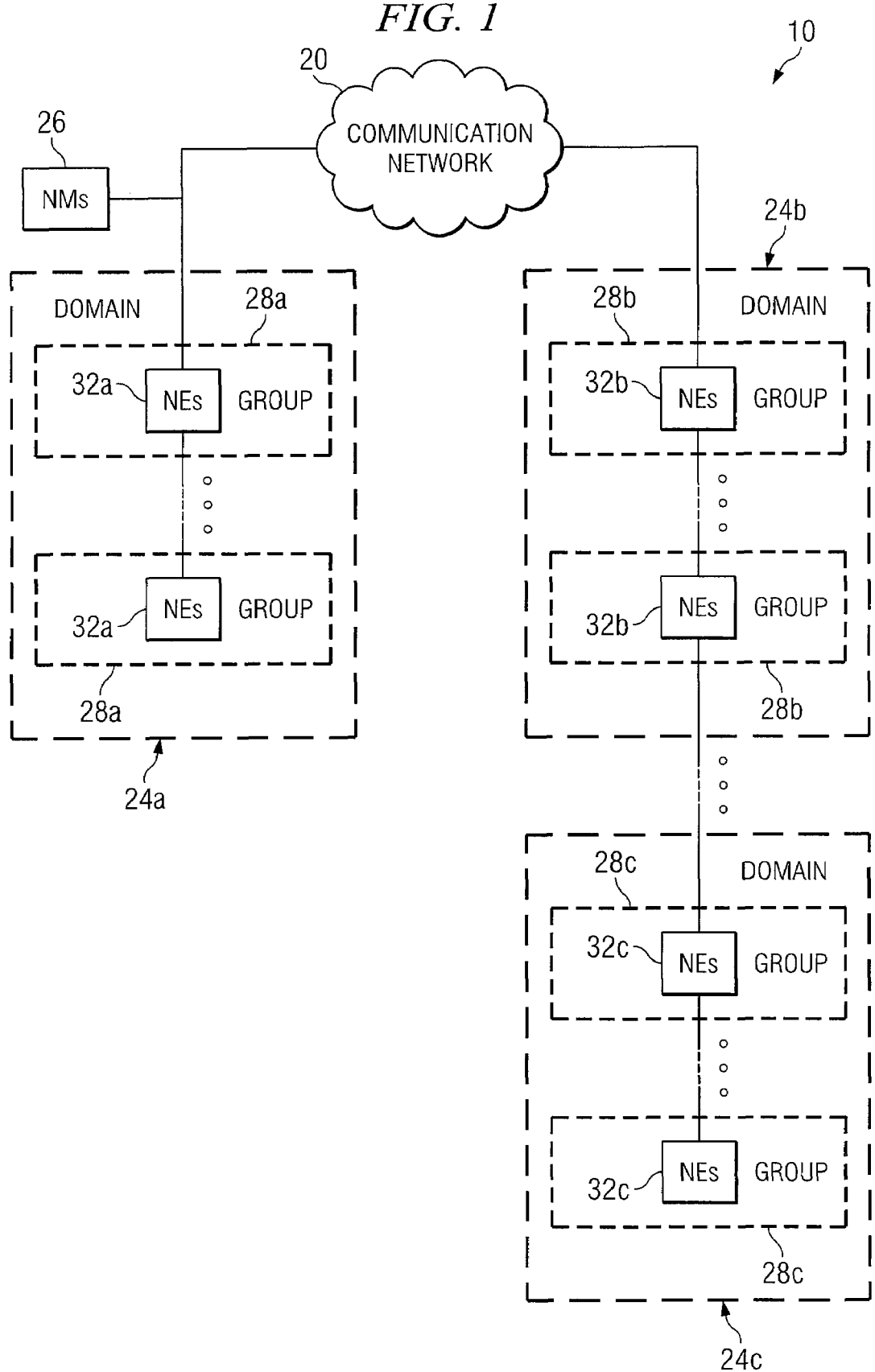
FIG. 1 is a block diagram illustrating one embodiment of a partitioned network that may be managed according to one embodiment of the present invention.
Figure 2:
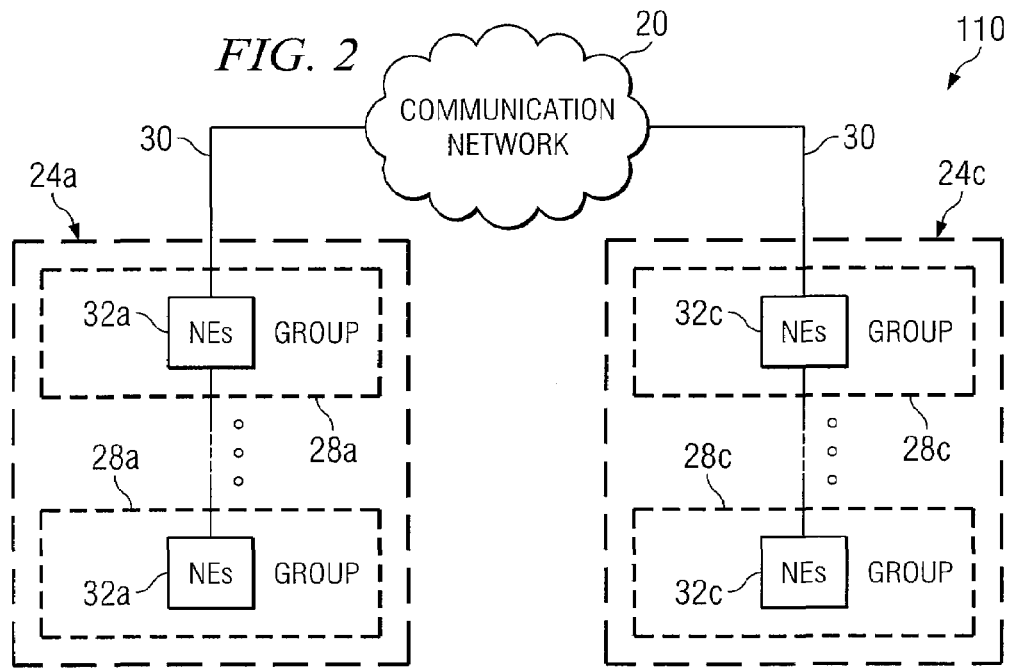
FIG. 2 is a diagram illustrating one embodiment of a user network view of a user network of the network of FIG. 1.
Figure 3:
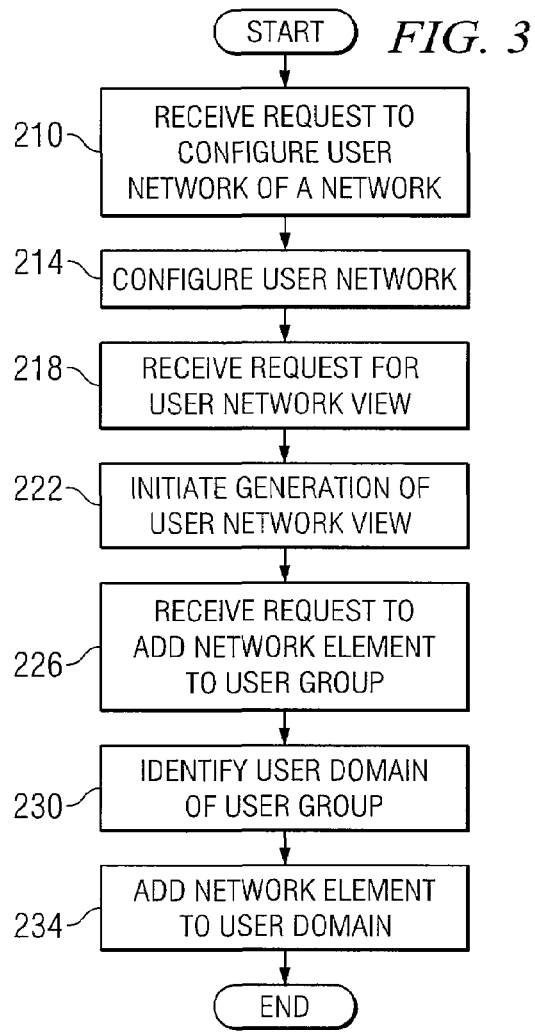
FIG. 3 is a flowchart illustrating one embodiment of a method for managing a network that may be used with the network of FIG. 1.

Embodiments of the present invention and its advantages are best understood by referring to FIGS. 1 through 3 of the drawings, like numerals being used for like and corresponding parts of the various drawings.

FIG. 1 is a block diagram illustrating one embodiment of a partitioned network 10 that may be managed according to one embodiment of the present invention. According to the embodiment, a network element 32 added to a group 28 of network 10 may inherit the domain 24 to which the group 28 belongs. In addition, a user network view of network 10 may be provided. The user network view may show the network elements 32 to which a user has access, but not network elements 32 to which the user does not have access.

According to one embodiment, network 10 may represent a communication network that allows components to communicate with other components. A communication network may comprise all or a portion of one or more of the following: a public switched telephone network (PSTN), a public or private data network, a local area network (LAN), a metropolitan area network (MAN), a wide area network (WAN), a local, regional, or global communication or computer network such as the Internet, a wireline or wireless network, an enterprise intranet, other suitable communication link, or any combination of any of the preceding.

According to one embodiment, network 10 may include one or more ring networks 20. A ring network may refer to a network of communication devices that has a ring topology. According to one embodiment, ring network 20 may comprise an optical fiber ring. Ring network 20 may utilize protocols such as a resilient packet ring (RPR) protocol. For example, ring network 20 may utilize RPR/Ethernet or RPR/Synchronous Optical Network (SONET).

Network 10 may communicate information. Information may refer to voice, data, text, audio, video, multimedia, control, signaling, other information, or any combination of any of the preceding. Information may be communicated in packets. A packet may comprise a bundle of data organized in a specific way for transmission.

Network 10 may communicate using signals. A signal may refer to an optical signal transmitted as light pulses. As an example, an optical signal may have a frequency of approximately 1550 nanometers and a data rate of 10, 20, 40, or over 40 gigabits per second.

Network 10 may utilize communication protocols and technologies to communicate. Examples of communication protocols and technologies include those set by the Institute of Electrical and Electronics Engineers, Inc. (IEEE) 802.xx standards, the International Telecommunications Union (ITU-T) standards, the European Telecommunications Standards Institute (ETSI) standards, the Internet Engineering Task Force (IETF) standards, or other standards.

According to one embodiment, a user may access at least a portion of network 10. A user may refer to an entity, such as one or more people, a company or other organization, one or more computing devices, and/or other entity that may communicate using network 10. A user may have a user identifier and a user account. A user identifier uniquely identifies the user, and a user account records information about the user.

Network 10 may include one or more components operable to perform the operations of network 10. A component may include any suitable arrangement of elements operable to perform the operations of the component, for example, an interface, logic, memory, other suitable element, or any suitable combination of any of the preceding.

An interface may receive input for the component, send output from the component, process the input and/or output, perform other suitable operation, or perform any suitable combination of any of the preceding. An interface may comprise one or more ports and/or conversion software.

A memory may store information. A memory may comprise one or more of any of the following: a Random Access Memory (RAM), a Read Only Memory (ROM), a magnetic disk, a Compact Disk (CD), a Digital Video Disk (DVD), a media storage, any other suitable information storage medium, or any suitable combination of any of the preceding.

Logic may process information for the component by receiving input and executing instructions to generate output from the input. Logic may include hardware, software, other logic, or any suitable combination of any of the preceding. Certain logic, such as a processor, may manage the operation of a component. Examples of a processor may include one or more computers, one or more microprocessors, one or more applications, other logic operable to manage the operation of a component, or any suitable combination of any of the preceding.

According to the illustrated embodiment, network 10 includes a communication network 20, one or more domains 24, and a network management system (NMS) 26 coupled as shown. Communication network 20 may represent a network that provides communication among the components of network 10.

A domain 24 may represent a partition of network 10. In an example, domains 24 may include one or more domains $d_i$. In the example, a user may have access to one or more specific user domains $d'_p$ that are selected from domains $d_i$, where the user domains form a user network. For example, a network operations center may have access to a specific user domain. "Access to a domain 24" may mean that a user has permission to communicate with the network elements 32 of the domain 24. The user may be required to be authorized before being allowed access to a user domain 24. Allowing users access only to specific user domains may allow for servicing different users using one or more common servers.

A domain 24 may include one or more groups 28, where a group 28 may represent at least a portion of a domain 24. In the above example, a domain $d_i$ may include one or more groups $g_{ij}$, and a user domain $d'_i$ may include one or more user groups $g'_{ij}$. According to the illustrated embodiment, a first group 28 may be regarded as a parent of a second group 28 if the second group 28 is subordinate to the first group 28. The second group 28 may be regarded as a child of the first group 28.

A group 24 may include one or more network elements 32. A network element 32 may represent any suitable device operable to communicate information within network 10. Examples of network elements 32 include dense wavelength division multiplexers (DWDMs), access gateways, endpoints, softswitch servers, trunk gateways, access service providers, Internet service providers, or other device operable to communicate information within network 10.

Network management system 26 may provide network management services to monitor and maintain network 10. Network management services may include, for example, performance management, configuration management, security management, accounting management, and/or fault management services. Performance management services may measure network performance metrics in order to maintain an acceptable level of performance. Configuration management services may monitor network and system configuration information in order to track and manage the effects of hardware and software elements on network operation. Security management services may control user access to network resources in order to reduce or prevent unauthorized access. Accounting management services may measure network utilization in order to regulate user use of the network. Fault management services may detect, log, notify users of, and/or resolve network problems in order to allow the network to run effectively.

According to one embodiment, network management system 26 may access a network description of network 10 that describes the domains 24, groups 28, and network elements 32 of network 10. The network description may also described the user domains 24, user groups 28, and user network elements 32 of a user network of network 10.

According to one embodiment, network management system 26 may be used to create and/or modify a user network. Network management system 26 may create a user network by designating certain domains 24 as user domains 24. The designations may be recorded in the network description. Network management system 26 may modify a user network by editing the network description to reflect the modification. The user network may be created and/or modified in response to receiving a request from an entity such as a network manager and/or the user.

According to one embodiment, network management system 26 may allow a network element 32 to be added to a group 28 of network 10 to inherit the domain 24 to which the group 28 belongs. Accordingly, a user may add a network element 32 to a group 28 without specifying the domain 24 of the group 28. According to the embodiment, network management system 26 may provide a user network view of network 10. An example of a user network view is described in more detail with reference to FIG. 2. A user network view may show the network elements 32 to which a user has access, but not network elements 32 to which the user does not have access. An example of a method according to which network management system 26 may operate is described in more detail with reference to FIG. 3.

Network 10 may be used in any suitable scenario. In a first example of a scenario, network 10 may be used by a local exchange company (LEC) that has ten private rings. In the example, network 10 may have 2,000 groups 28, such as 1,990 LEC groups and ten private groups. Network 10 may be partitioned into 11 domains 24, one for the LEC groups and one each for the ten private groups. A user may be assigned any suitable number of the domains. For example, an LEC user may be assigned only the domain of the LEC, or may be assigned a super domain that includes the 11 domains 24.

In a second example of a scenario, a company may use a single server to manage separate domains 24, each associated with a particular business unit. A domain 24 may have, for example, 500 network elements 32.

In a third example of a scenario, a user may be charged for access to each user domain 24 of the user network. In the example, the user may require a license for each user domain 24.

Modifications, additions, or omissions may be made to network 10 without departing from the scope of the invention. The components of network 10 may be integrated or separated. Moreover, the operations of network 10 may be performed by more, fewer, or other components. For example, the operations of network management system 26 may be performed by more than one component. Additionally, operations of network 10 may be performed using any suitable logic. As used in this document, "each" refers to each member of a set or each member of a subset of a set.

FIG. 2 is a diagram illustrating one embodiment of a user network view 110 of a user network of network 10 of FIG. 1. A network view may refer to any suitable output, such as visual output, that includes network information that describes network 10. Moreover, a network view may describe network 10 using any suitable symbols, such as characters (for example, text or numbers), figures, tables, and/or other symbols. Moreover, a network view may have any suitable format. For example, a network view may have a soft copy format, such as a display or a electronic file, or a hard copy format, such as a paper document.

According to the embodiment, user network view 110 may display user domains 24 to which a user has access. In the illustrated embodiment, the user has access to domains 24a and 24c, but not to domain 24b. User domains 24 includes user groups 32. In the illustrated embodiment, user groups 32 include groups 28a and 28c. User groups 32 include user network elements 32 to which the user has access. In the illustrated embodiment, user network elements 32 include user network elements 32a and 32c.

User network view 110 may display any suitable portions of network 10. According to one embodiment, user network view 110 may show only user domains 24, but not show domains 24 to which the user does not have access. If users have different user domains 24, the user network views 110 for the users are also different. In the illustrated example, domain 24b is not in a user domain 24, so therefore it is eliminated from user network view 110. User network view 110 may show common links. In the illustrated example, common links 30 between user domains 24 are shown.

According to another embodiment, a user network view 110 may show terminating nodes of user network elements 32. For example, a network may have multiple separate network operation centers, where each operation center provides independent monitoring of user network elements 32.

User network view 110 may include any suitable information. As a first example, user network view 110 may show the alarms of the user network. As a second example, user network view 110 may include network element information. Network element information may include any suitable information that describes a network element 32. Examples of network element information include the type of network element, protocols used by the network element, techniques for communicating with the network element, and/or other information. According to one embodiment, a user may have access to only certain types of network element information of the user network.

Modifications, additions, or omissions may be made to user network view 110 without departing from the scope of the invention. User network view 110 may include more, less, or other information about the user network. Additionally, the information may be organized in any suitable manner.

FIG. 3 is a flowchart illustrating one embodiment of a method for managing a network that may be used with network 10 of FIG. 1. The method begins at step 210, where a network management system 26 receives a request to create a user network of network 10 for a user. Network 10 may include one or more domains 24, where a domain 24 includes one or more groups 28. Network 10 may be described by a network description.

The user network is created at step 214. The user network may include one or more user domains 24 to which the user has access, and a user domain 24 may include one or more user groups 28. The user network may be created by recording the user domains 24 and user groups 28 in the network description.

Network management system 26 receives a request for a user network view 110 at step 218. User network view 110 may show user domains 24, but not other domains 24. Network management system 26 initiates generation of user network view 110 at step 222. User network view 110 may be generated at, for example, a display of a user computer.

Network management system 26 receives a request to add a network element 32 to a user group 28 at step 226. The user domain 24 of the user group 28 is identified at step 230. User domain 24 may be identified from the network description of network 10. Network management system 26 may automatically identify the user domain 24. Accordingly, a user or administrator need not assign the domain 24. The network element 32 is added to the identified user domain 24 at step 234. After adding network element 32 to the user domain 24, the method terminates.

Modifications, additions, or omissions may be made to the method without departing from the scope of the invention. The method may include more, fewer, or other steps. Additionally, steps may be performed in any suitable order.

Certain embodiments of the invention may provide one or more technical advantages. A technical advantage of one embodiment may be that a network element added to a group may inherit the domain to which the group belongs. Accordingly, a user may add a network element to a group, without specifying the domain of the group.

Another technical advantage of one embodiment may be that a user network view may be provided. The user network view may show the network elements to which a user has access, but not network elements to which the user does not have access. Accordingly, the user may view the network elements to which the user has access while being prevented from viewing network elements to which the user does not have access.

While this disclosure has been described in terms of certain embodiments, alterations and permutations of the embodiments will be apparent to those skilled in the art. Accordingly, the above description of the embodiments does not constrain this disclosure. Other changes, substitutions, and alterations are possible without departing from the spirit and scope of this disclosure, as defined by the following claims.

What is claimed is:

1. A method for managing a network, comprising:
   receiving a request to create a user network of a network, the network comprising a plurality of domains, a domain of the plurality of domains comprising one or more groups, a group of the one or more groups comprising one or more network elements;
   creating the user network, the user network comprising one or more user domains of the plurality of domains, a user domain of the one or more user domains representing a domain to which a user has access, the user domain comprising one or more user groups;
   initiating generation of a user network view, the user network view displaying the one or more user domains and network element information that can be accessed by the user; and
   preventing display of domains other than the one or more user domains.

2. The method of claim 1,
   wherein the user network view displaying displays:
   one or more user network elements of the one or more user domains; and
   a common link between at least two of the one or more user domains.

3. The method of claim 1, further comprising:
   receiving a request to add a network element to a user group of the one or more user groups; and
   automatically adding the network element to the user domain comprising the user group.

4. The method of claim 1, further comprising:
automatically adding a network element to a user group of the one or more user groups by:
identifying the user domain comprising the user group; and
adding the network element to the identified user domain.

5. A network management system, comprising:
an interface coupled to the network and operable to:
receive a request to create a user network of a network, the network comprising a plurality of domains, a domain of the plurality of domains comprising one or more groups, a group of the one or more groups comprising one or more network elements; and
one or more processors coupled to the interface and operable to:
create the user network, the user network comprising one or more user domains of the plurality of domains, a user domain of the one or more user domains representing a domain to which a user has access, the user domain comprising one or more user groups; and
initiating generation of a user network view, the user network view displaying the one or more user domains and network element information that can be accessed by the user;
preventing display of domains other than the one or more user domains.

6. The system of claim 5,
wherein the user network view displays:
one or more user network elements of the one or more user domains; and
a common link between at least two of the one or more user domains.

7. The system of claim 5, the one or more processors further operable to:
receive a request to add a network element to a user group of the one or more user groups; and
automatically add the network element to the user domain comprising the user group.

8. The system of claim 5, the one or more processors further operable to:
automatically add a network element to a user group of the one or more user groups by:
identifying the user domain comprising the user group; and
adding the network element to the identified user domain.

9. Software for managing a network, the software embodied in computer-readable storage media and operable to:
receive a request to create a user network of a network, the network comprising a plurality of domains, a domain of the plurality of domains comprising one or more groups, a group of the one or more groups comprising one or more network elements;
create the user network, the user network comprising one or more user domains of the plurality of domains, a user domain of the one or more user domains representing a domain to which a user has access, the user domain comprising one or more user groups;
initiate generation of a user network view, the user network view displaying the one or more user domains and network element information that can be accessed by the user; and
prevent display of domains other than the one or more user domains.

10. The software of claim 9,
wherein the user network view displaying displays:
one or more user network elements of the one or more user domains; and
a common link between at least two of the one or more user domains.

11. The software of claim 9, further operable to:
receive a request to add a network element to a user group of the one or more user groups; and
automatically add the network element to the user domain comprising the user group.

12. The software of claim 9, further operable to:
automatically add a network element to a user group of the one or more user groups by:
identifying the user domain comprising the user group; and
adding the network element to the identified user domain.

13. A system for managing a network, comprising:
means for receiving a request to create a user network of a network, the network comprising a plurality of domains, a domain of the plurality of domains comprising one or more groups, a group of the one or more groups comprising one or more network elements; and
means for creating the user network, the user network comprising one or more user domains of the plurality of domains, a user domain of the one or more user domains representing a domain to which a user has access, the user domain comprising one or more user groups;
means for initiating generation of a user network view, the user network view displaying the one or more user domains and network element information that can be accessed by the user;
means for preventing display of domains other than the one or more user domains.

14. A method for managing a network, comprising:
receiving a request to create a user network of a network, the network comprising a plurality of domains, a domain of the plurality of domains comprising one or more groups, a group of the one or more groups comprising one or more network elements;
creating the user network, the user network comprising one or more user domains of the plurality of domains, a user domain of the one or more user domains representing a domain to which a user has access, the user domain comprising one or more user groups;
initiating generation of a user network view, the user network view displaying the one or more user domains, the user network view displaying:
one or more user network elements of the one or more user domains;
a common link between at least two of the one or more user domains; and
network element information that can be accessed by the user;
preventing display of domains other than the one or more user domains;
receiving a request to add a network element to a user group of the one or more user groups; and
automatically adding a network element to a user group of the one or more user groups by:
identifying the user domain comprising the user group; and
adding the network element to the identified user domain.

* * * * *

UNITED STATES PATENT AND TRADEMARK OFFICE
CERTIFICATE OF CORRECTION

PATENT NO.        : 7,603,455 B2
APPLICATION NO.   : 11/535682
DATED             : October 13, 2009
INVENTOR(S)       : David D. Jameson It is certified that error appears in the above-identified patent and that said Letters Patent is hereby corrected as shown below:

In the Claims

Column 6, Line 58 after "wherein the user network view" please delete "displaying".

Column 8, Line 2 after "wherein the user network view" please delete "displaying".

Signed and Sealed this
Twenty-sixth Day of November, 2013

Margaret A. Focarino
*Commissioner for Patents of the United States Patent and Trademark Office*